US005934010A

United States Patent [19]
Blackburn

[11] Patent Number: 5,934,010
[45] Date of Patent: Aug. 10, 1999

[54] TACKLE BOX WITH INTERNALLY-MOUNTED, ROTATABLE LURE-HOLDING PLATES

[76] Inventor: Edwin L. Blackburn, 814 Blackburn, Grand Prairie, Tex. 75050

[21] Appl. No.: 08/822,196

[22] Filed: Mar. 20, 1997

Related U.S. Application Data

[60] Provisional application No. 60/013,908, Mar. 20, 1996.
[51] Int. Cl.⁶ .................................................. A01K 97/06
[52] U.S. Cl. ...................... 43/57.1; 43/54.1; 206/315.11
[58] Field of Search ................... 43/54.1, 57.1, 43/57.2; 206/315.11; 224/920

[56] References Cited

U.S. PATENT DOCUMENTS

| | | | |
|---|---|---|---|
| 1,954,127 | 4/1934 | Harsted | 43/57.1 |
| 2,138,190 | 11/1938 | Myers | 43/54.1 |
| 2,220,817 | 11/1940 | Holmes | 43/57.1 |
| 2,364,807 | 12/1944 | Nelson, Jr. | 43/57.1 |
| 2,603,549 | 7/1952 | Tessmer et al. | 43/57.1 |
| 2,604,372 | 7/1952 | Klinglesmith | 43/54.1 |
| 2,661,565 | 12/1953 | Jackson | 43/57.1 |
| 2,665,517 | 1/1954 | Archer | 43/57.1 |
| 2,702,442 | 2/1955 | Wallen | 43/57.1 |
| 2,814,152 | 11/1957 | Trujillo | 43/57.1 |
| 2,927,395 | 3/1960 | Bartlett | 43/57.2 |
| 3,022,600 | 2/1962 | Glascoff | 43/57.1 |
| 3,154,880 | 11/1964 | Campbell | 43/57.1 |
| 3,180,053 | 4/1965 | Norton et al. | 43/57.2 |
| 3,378,134 | 4/1968 | Wilkinson et al. | 43/54.1 |
| 3,490,169 | 1/1970 | Tweed | 43/57.1 |
| 3,524,571 | 8/1970 | Young et al. | 224/920 |
| 3,758,977 | 9/1973 | Miller | 43/57.1 |
| 4,006,563 | 2/1977 | Porter et al. | 43/54.1 |
| 4,238,901 | 12/1980 | Martinet et al. | 43/57.1 |
| 4,563,834 | 1/1986 | Spencer | 43/57.1 |
| 4,604,822 | 8/1986 | Christenberry | 43/57.1 |
| 4,756,412 | 7/1988 | Graves et al. | 43/54.1 |
| 4,770,327 | 9/1988 | Fortson | 43/54.1 |
| 4,791,752 | 12/1988 | Van Kampen | 43/54.1 |
| 4,999,943 | 3/1991 | Crabtree | 43/54.1 |
| 5,018,298 | 5/1991 | Spears | 43/57.2 |
| 5,025,588 | 6/1991 | Echols | 43/57.1 |
| 5,095,645 | 3/1992 | Borawski | 43/57.1 |
| 5,289,940 | 3/1994 | Wisenbaugh | 43/54.1 |
| 5,386,662 | 2/1995 | Vader et al. | 43/57.2 |
| 5,392,557 | 2/1995 | Harmon et al. | 43/57.1 |
| 5,606,820 | 3/1997 | Suddeth | 43/57.1 |
| 5,657,573 | 8/1997 | Fischer et al. | 43/57.1 |

FOREIGN PATENT DOCUMENTS 524940  5/1956  Canada .................................. 43/54.1

*Primary Examiner*—Michael J. Carone
*Assistant Examiner*—Darren Ark
*Attorney, Agent, or Firm*—Charles W. McHugh

[57] ABSTRACT

A tackle box for organizing and storing a large quantity of fishing lures in such a way that any particular lure can be rapidly located and retrieved from the box for use. Each lure is stored by placing its depending hooks in one or more slots on a given one of a plurality of plates, the plates extending radially outward from a support rod or spindle, and the rod or spindle being mounted within a tackle box for rotation about a longitudinal axis. In the preferred embodiment, the rod's axis of rotation is horizontal when the tackle box is resting horizontally.

18 Claims, 4 Drawing Sheets

TACKLE BOX WITH INTERNALLY-MOUNTED, ROTATABLE LURE-HOLDING PLATES

REFERENCE TO RELATED APPLICATION

This document contains subject matter that was previously disclosed in Provisional Patent Application Ser. No. 60/013,908 filed Mar. 20, 1996.

FIELD OF THE INVENTION

This invention relates generally to tackle boxes that are routinely used by fisherman to store lures (i.e. artificial baits) for catching fish; more specifically, it relates to an improved box for organizing and storing a large quantity of lures in such a way that any particular lure can be rapidly located and retrieved from the box for use. Each lure is stored by placing its depending hooks in one or more slots on a given one of a plurality of plates, said plates extending radially outward from a support rod (or spindle), and said rod being mounted within a tackle box for rotation about a longitudinal axis. In the preferred embodiment, the rod's axis of rotation is horizontal when the tackle box is resting horizontally in a normal position alongside a person who is fishing.

BACKGROUND OF THE INVENTION

It is not unusual for serious fisherman to own more than a hundred fishing lures, many of which they routinely take on any given fishing trip. As used herein the term "fisherman" will be broadly used to refer to those persons who pursue fish with a rod, line and an artificial bait—commonly known as a lure or plug. The term "fisherman" will also be used without specific reference or limitation as to the gender of the individual person; but for convenience, the masculine pronoun will be universally used to refer to the person who is doing the fishing. If spread out on a large horizontal surface, these lures might be arranged into a variety of categories based on size, shape, color, type, style, number of depending hooks, type of ancillary devices that may be attached (i.e., spinners or anti-weed devices), manufacturer, etc. When concentrated into a relatively compact tackle box, any organizational concept that could be practiced on a large horizontal surface can be compromised—to the extent that it sometimes becomes difficult for a fisherman to locate exactly what lure he wants to use at a given time. When fishing in a tournament, when time is of the essence, any time that is wasted in searching in a tackle box for a particular lure is time that is not profitably spent in actually trying to catch fish.

In view of the fact that fishing with lures is an activity that had been around for so many years, it should not be surprising that there have been several suggestions for ways in which to manage (and store) a large quantity of lures. U.S. Pat. No. 2,927,395 to Bartlett entitled "Cylinder-Type Lure Holder" shows a hollow cylinder holder that has slots around its periphery for holding several lures. But while the Bartlett holder would seem to be quite suitable for holding spoons that have a single hook or a single treble hook, the holder does not look like it would be either as safe or as useful for holding lures that have two or three treble hooks. That is, any given one of the notches at the top of the cylinder can hold a single hook, but a single notch is not adapted for holding two hooks. Neither are two spaced notches at the top of a Bartlett holder adapted to hold the two treble hooks that are so common on modern lures Another holder for multiple lures is shown in U.S. Pat. No. 4,604,822 to Christenberry entitled "Fishing Lure Holder." Like the Bartlett holder, the Christenberry holder appears to be suitable for capturing and holding as lure with a single hook, but it is not designed for—and does not appear to be useful in—capturing all of the hooks that depend from a two-hook or a three-hook lure. And any holder that leaves a lure's hooks free to catch a fisherman's fingers before the lure catches any fish is likely to be used on only a single fishing trip.

A completely different concept in lure holders is shown in U.S. Pat. No. 5,095,645 to Borawski entitled "Fishing Lure Holder." The Borawski holder shows a series of side-by-side tubes is designed to receive both the body and the hooks of a single lure. While there seem to be some advantages to a Borawski holder, including the ability to store lures more compactly than the previously mentioned holders, it also appears that the Borawski concept would pose a significant risk to a fisherman's fingers. This perceived risk exists because of the need to grasp and maneuver hooks that must be correctly aligned with an opening in an individual one of the small tubes when a lure is being stored. Also, the most natural way for a fisherman to handle a modern lure is to grab its body from the top, allowing the depending hooks to hang more or less vertically under lure's body. It would seem to be difficult to sell experienced fishermen anything that does not simplify the grabbing of a single lure's body without putting fingers at risk from nearby hooks. And the advantage of being able to carry more lures in a compact space cannot compensate for the extra time and attention that may be required in order to safely use a Borawski holder. So, it is believed that there still exists a need to be able to hole fishing lures of various sizes and shapes in such a way that they can be quickly stored and retrieved—in a manner that promotes safety because it promotes manual control of individual lures as well as the efficient collection of a plurality lures.

Accordingly, it is an object of this invention to provide an improved way of organizing and storing fishing lures so that they can be quickly found and retrieved for use by a fisherman.

Another object is to provide a means for holding individual lures so that their depending hooks are not likely to become entangled with the hooks of adjacent lures.

A further object is to support lures in such a way that their hooks will tend to air-dry quickly after they have been removed from a body of water, in order that the accumulation of rust on the hooks will be minimized.

A still further object is to provide a tackle box that is not vulnerable to having its contents scattered in different directions—if and when the tackle box is tilted or even accidentally turned over during handling or when fishing.

These and other objects will be apparent from a reading of the specification and the accompanying drawings.

BRIEF DESCRIPTION OF THE SEVERAL FIGURES OF THE DRAWING

BRIEF DESCRIPTION OF THE INVENTION

Figure 1:
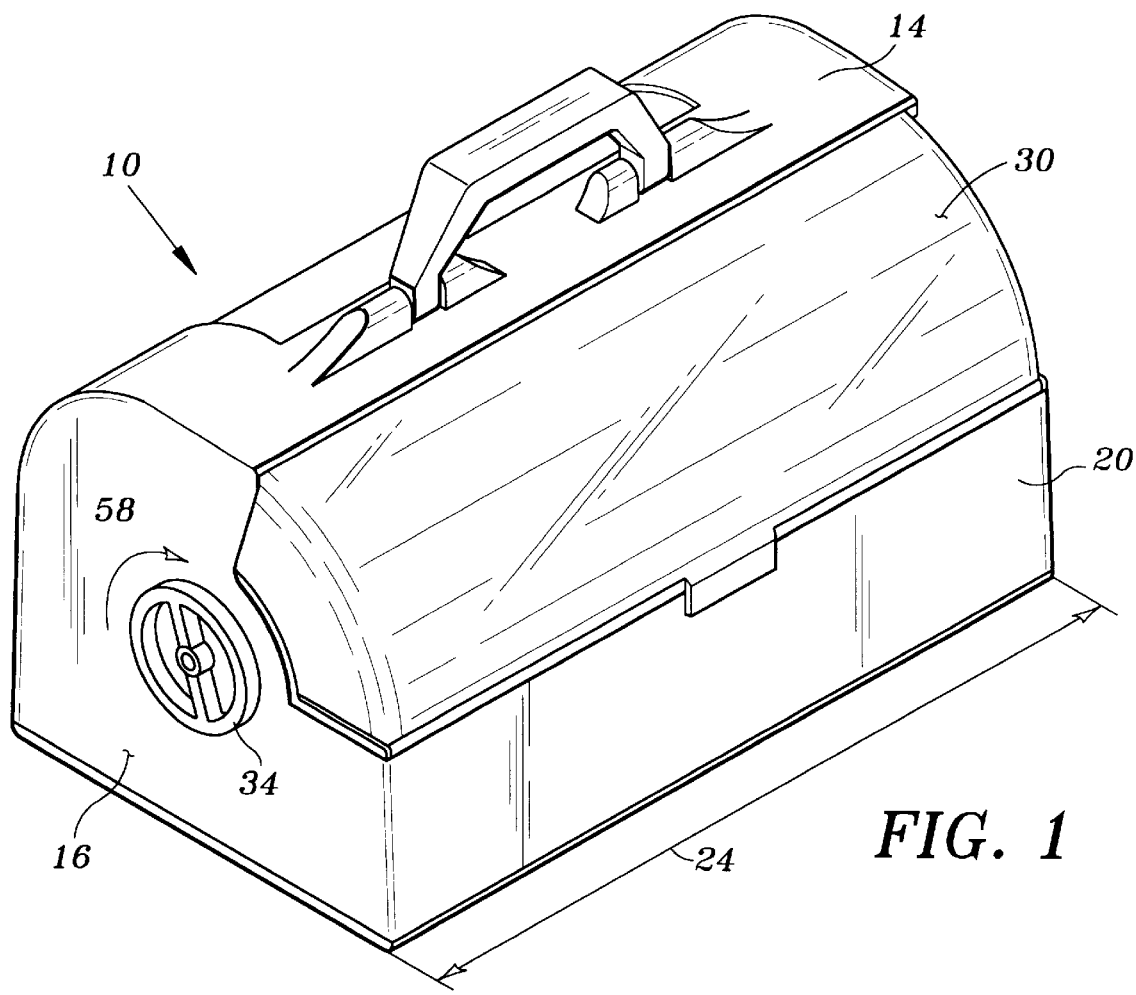
FIG. 1 is a perspective view of one embodiment of the invention in which a tackle box has a single rotatable holder, said tackle box having a transparent element in the form of a lid that is shown closed, and the box being oriented with its base oriented horizontally.

In brief, the invention may be considered to be a portable enclosure or box having the general shape of a rectangular parallelpiped. The box has a top and will usually have a handle affixed thereto—by which the box may be carried from place to place by a fisherman. In the preferred embodiment, the box has a top that is made up of a fixed portion and a movable portion. The fixed portion of the top is normally opaque, as are the sides, the endwalls and the bottom of the box. The movable portion of the top is advantageously made of a transparent material (e.g., a rigid plastic material), so that a fisherman might be able to see what is immediately underneath the movable portion at any given time. When the movable portion has been rotated or otherwise moved out of the way, a fisherman will have ready access to the fishing lures that are stored within the box.

The lure-holding box is intended to hold a plurality of fishing lures—typically fifty or more, for long-term or short-term storage. A preferred holding device for the lures is a generally planar blade (or elongated plate) that has a plurality of slots into which may be slipped the hooks that typically depend from the bottom of a lure. If the lure is relatively short, e.g., about three inches, its depending hooks may fit into a single slot. If the lure is relatively long, e.g., about six inches long, the one set of the lure's hooks may have to be placed into one slot and another set of hooks may have to be captured in a different slot. After a desired quantity of lures have been installed on a given holding device, a keeper or retainer is then used to capture whatever lures have been inserted into the respective slots on a blade. The keeper effectively captures the lures and holds them on a blade until they are wanted by a fisherman.

In the preferred embodiment, a plurality of the generally planar holding devices (e.g., three, four or five devices) are permanently affixed in a cantilevered manner to an elongated member that is equivalent to a central spingle—for rotation about a fixed axis. That is, the holding devices protrude outwardly in a generally radial direction from a central spindle so that, when the assembly is examined from one end, the orientation of the holding devices would have an appearance like the spokes that extend radially outward from the hub of a wagon wheel. This axis of rotation for the assembly is preferably horizontal when the box is stored in a normal, horizontal manner.

The elongated member (which is also sometimes referred to as a spindle) and its associated blades may be permanently mounted for rotation in the box, or they may be selectively removable from the box as a unit. In the "permanent" embodiment, an axial extension of the central spindle extends through at least one of the box's endwalls, and a knob or end cap is rigidly connected to the axial extension on the outside of the box. The size and shape of the external knob or end cap is such that it may be grasped and manually rotated, causing all of the holding devices on the inside of the box to also rotate. Rotation of the holding devices causes some of the lures to be temporarily brought to the upper front of the box, while at the same time other lures are rotated to what might be called a rearward or remote part of the box. As the lures are temporarily brought to the front of the box, they may be seen through the upper opening in the box's top. When a desired lure is visible, the transparent cover is temporarily moved to an out-of-the-way position and the keeper is released, such that the body of the desired lure may be grasped and the lure withdrawn from its storage slot.

It should perhaps also be mentioned that the process of loading and retrieving lures from a holder in accordance with this invention can be accomplished with a series of steps, each of which can be sequentially performed with only one of a fisherman's two hands. That is, two hands are often useful, but nothing disclosed herein absolutely requires the use of two hands. Therefore, a fisherman can continue to hold a rod and reel with one hand while retrieving a desired lure with his other hand, etc. Or, if the water on a lake has suddenly gotten a bit choppy, and if a fisherman wants to help maintain his balance in a boat by holding onto some structural part of the boat, there is no necessity to let go of the boat in order to retrieve and install a favorite lure—and continue fishing until the waters return to their originally smooth condition.

DETAILED DESCRIPTION OF A PREFERRED EMBODIMENT OF THE INVENTION

Figure 2:
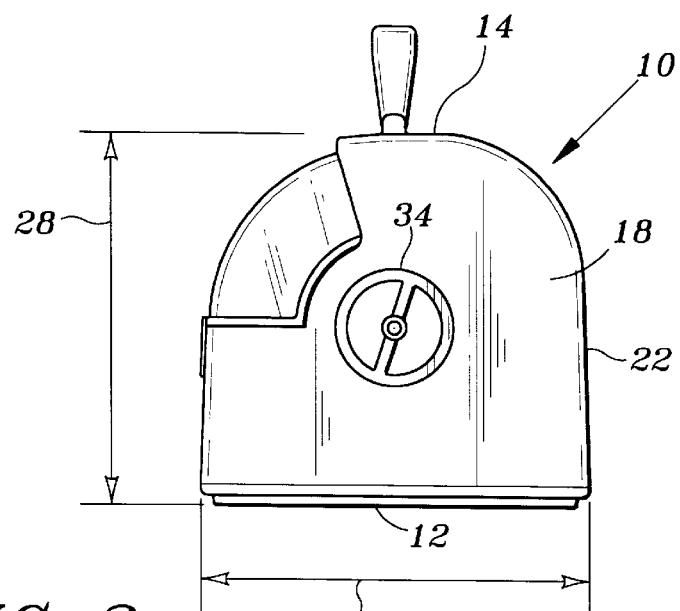
FIG. 2 is an elevation view of the box taken from one of tis two ends, with the transparent cover shown closed (as in FIG. 1)

Referring initially to FIGS. 1 and 2, an enclosure or box 10 has a bottom 12, a top 14, a pair of spaced-apart endwalls 16, 18, and a front 20 and a back 22; all of these structural pieces are shaped and sized to contribute to the general stability of the box as it rests on some horizontal surface. To facilitate a description of the box, the distance from one endwall 16 to the other 18 may be defined as the length of the box; this dimension and its orientation is identified in FIG. 1 by the arrow 24. The box's width is shown as the distance between the box's front 20 and back 22, and is identified in FIG. 2 by the arrow 26. The box's height is shown as the distance between the box's top 14 and bottom 12, and is identified in FIG. 2 by the arrow 28. As with tackle boxes of the prior art, the material from which the box is made is relatively stiff and water-proof; those skilled in the art will recognize that a suitable material will be selected from that class of materials (often called plastics) that include polyethylene, polypropylene, ABS and the like. The endwalls, sides, top and bottom will typically have a nominal thickness within the range of about 1/16th to about 1/8th inch, so that they will have the strength to tolerate the sometimes rough environmental conditions to which tackle boxes are routinely subjected.

Figure 3:
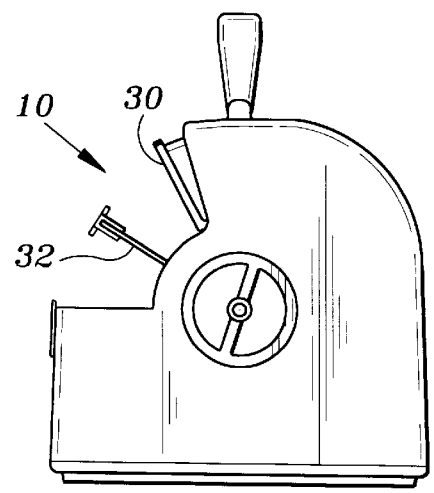
FIG. 3 is an end view similar to FIG. 2, but with the transparent cover being moved back to a stored position where it will rest under a fixed portion of the top, and also showing one of the lure-holding blades that is both visible and accessible when the cover has been moved back to its stored position.

Referring additionally to FIG. 3, it will be seen that a portion of the box's top has been moved backyard from its protective position (as shown in FIG. 2) to a retracted position. When in its retracted position, this movable portion 30 (which may aptly be thought of as a protective lid) makes it possible for a fisherman to reach through an upper, frontal opening in the box and gain access to one of the generally planar members 32 within the box. If a desired lure is not at that time within a fisherman's field of view, he may simply grab and rotate a structural cap 34 that is exposed at the outside of the box. By applying torque to the cap 34, a lure holder 36 within the box may be rotated about an axis that is generally parallel to the direction in which the box's length is measured. This will cause the planar member 32 that is seen in FIG. 3 to rotate out of the way (and downward), and a different planar member will be brought into view, along with a fresh grouping of lures.

Figure 4:
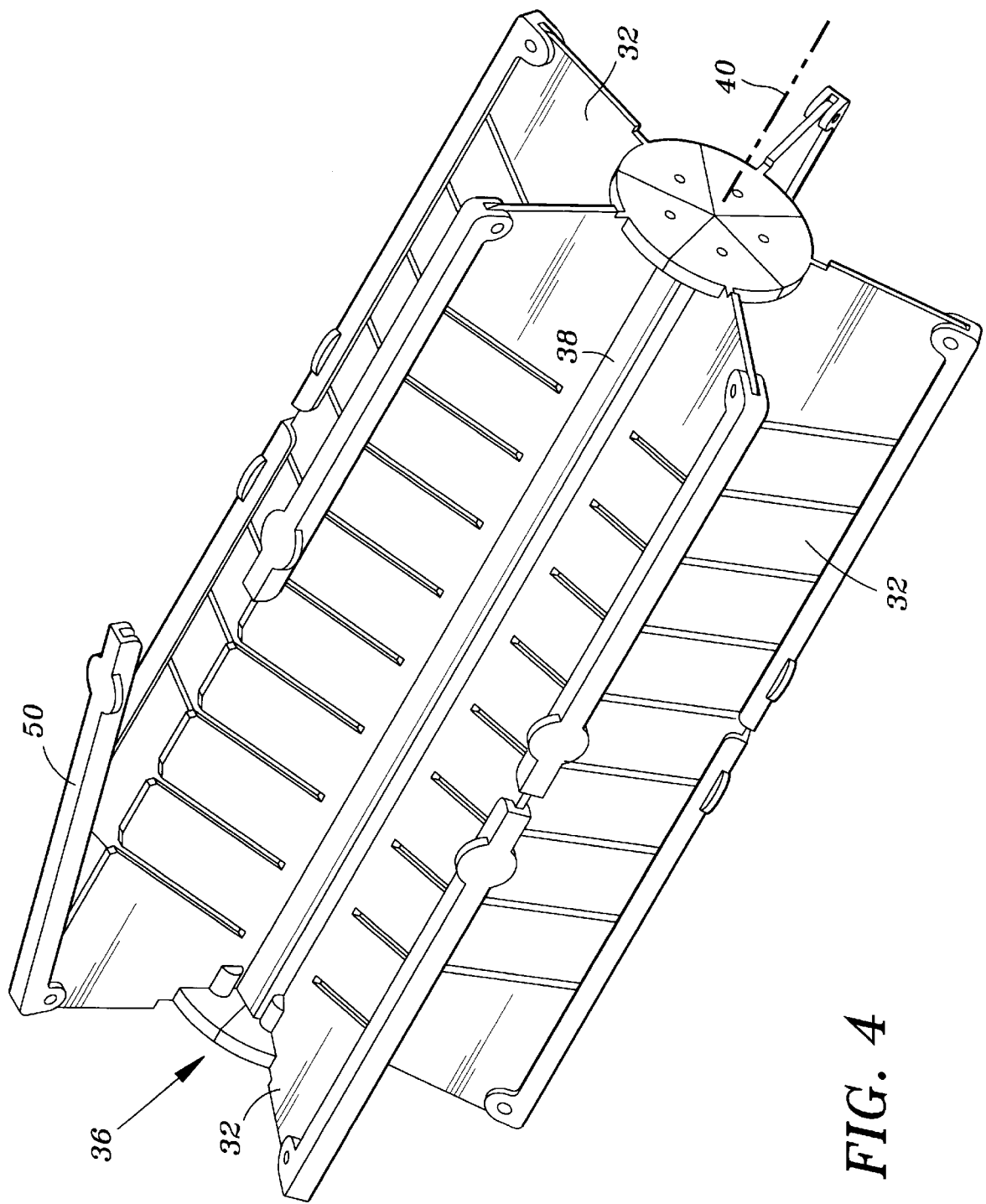
FIG. 4 is a perspective view of one embodiment of a rotatable lure holder that has five lure-holding blades that extend radially outward from a central spindle.

Referring next to FIG. 4, a preferred lure holder 36 having five generally planar members or blades 32 is shown. The holder 36 includes an elongated element 38 that may be said to have the general purpose of a "spindle"—in the sense that it serves the function of a long axle at the center of the holder. Extending outwardly from the elongated element 38 in generally radial directions are a plurality of thin and generally planar blades 32. It may be fairly stated that the blades 32 are supported by, and are movable with, the elongated element 38, and they are all connected together; therefore, rotating one of the pieces will cause all of them to rotate as a unit.

Figure 5:
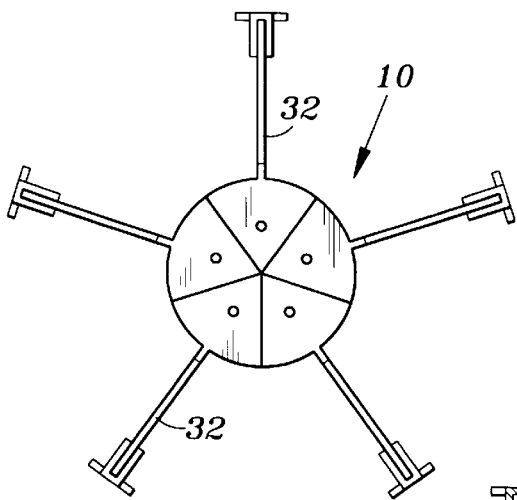
FIG. 5 is an end view of the lure holder shown in FIG. 4.
Figure 6:
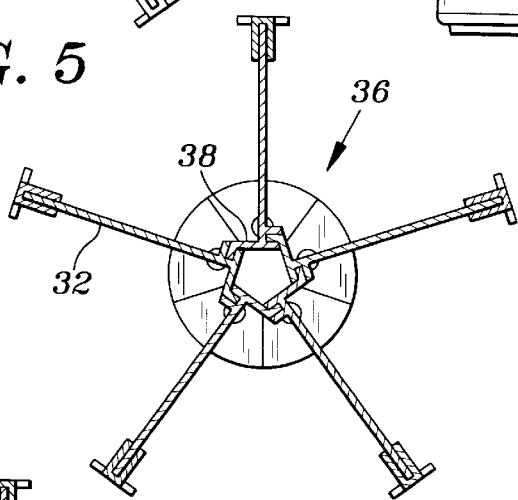
FIG. 6 is a transverse cross-sectional view of the lure holder shown in FIG. 4, showing how a central elongated element may be created by rigidly joining together proximal portions of five lure-holding blades.

FIG. 5 is an end view of the embodiment of a lure holder 36 shown in FIG. 4; and FIG. 6 is a transverse cross-sectional view of the same holder. One of the things clearly shown in FIG. 6 is that the proximal portions of the five blades have structural pieces that, when rigidly connected together, create the elongated element 38; and it is the longitudinal axis 40 of this elongated element about which the holder may be made to selectively rotate.

Figure 7:
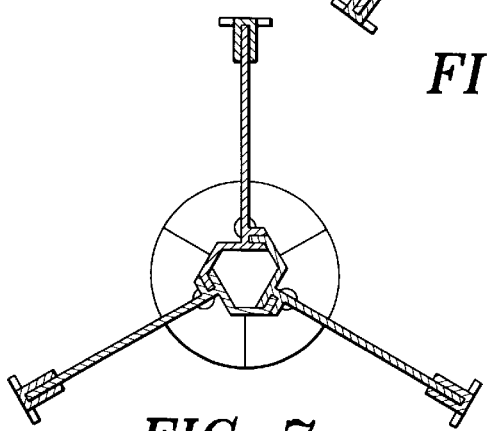
FIG. 7 is a transverse cross-sectional view of another embodiment of the invention in which there are three generally planar blades instead of the five blades shown in FIG. 5.

FIG. 7 is a transverse cross-sectional view of another embodiment of the invention in which there are three generally planar blades instead of the five blades shown in FIG. 5. In general, it is believed that there should be at least three radially extending blades in an optimum lure holder; and five blades seem to offer the best compromise between: 1) the desire to consume only a reasonable amount of space, 2) the desire to store a large quantity of lures in a small space, and 3) the desire to avoid unduly cramped "working" conditions between adjacent blades. Expressed in other words, a configuration that includes six or more blades would be operative, but it would likely require a significantly greater diameter for the lure holder—in order to insure that there is room for an average fisherman to manipulate fishing lures (and maneuver his hand or hands) between adjacent blades. A diameter of about 10 inches for a lure holder 36 is believed to be about right for holding most fresh-water fishing lures, while a large diameter would likely be appropriate for holding larger salt-water lures.

Figure 8:
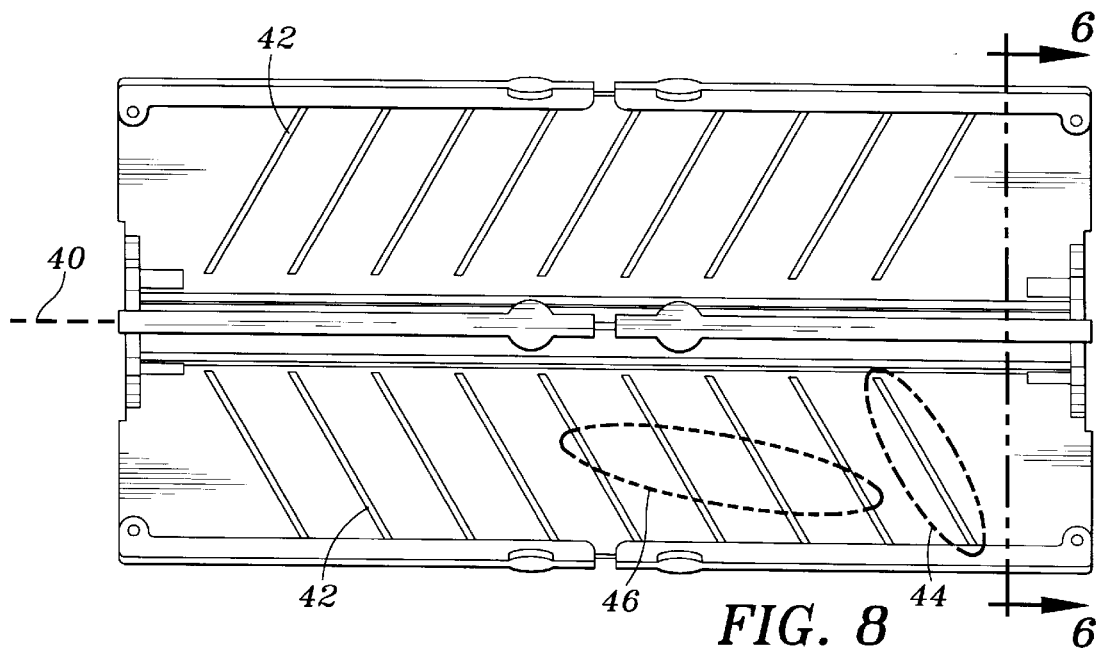
FIG. 8 is a top view of the lure holder shown in FIG. 6, clearly revealing two identical lure-holding blades that are extending in almost opposite directions.
Figure 9:
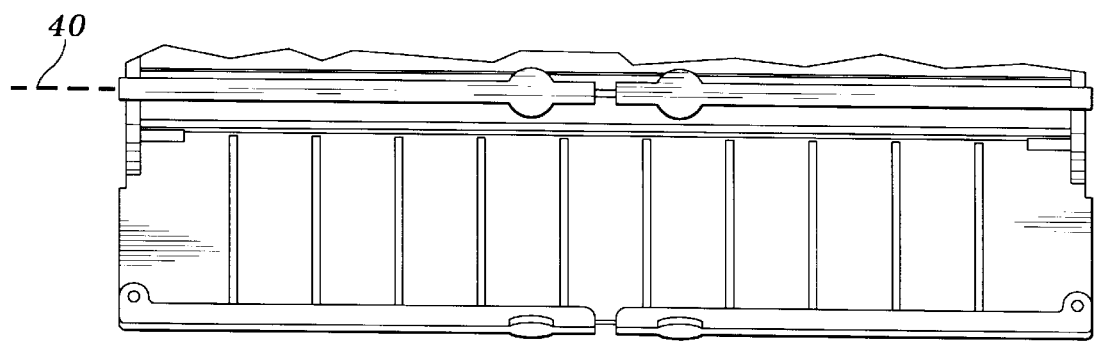
FIG. 9 is a top plan view of an alternative embodiment of a blade, wherein the plurality of slots are oriented so as to be perpendicular to the axis of rotation of the holder.
Figure 10:
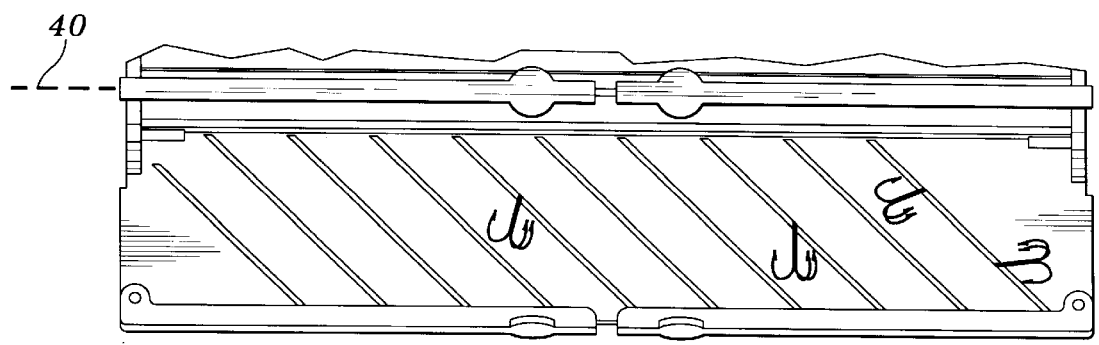
FIG. 10 is a top plan view of another embodiment of a blade, wherein the plurality of slots are oriented so as to make an angle with respect to the axis of rotation that is relatively large.

Turning next to FIGS. 8, 9 and 10, the general shape of some exemplary planar blades may be readily compared. In FIG. 8, it may be seen that the planar blade 32 has a generally rectangular shape, with a length of about twenty inches and a width (or radial length) of about four inches.

Hence, this preferred blade has an area of about 60 square inches, which is more than what is believed to be a minimum effective area of about 50 square inches. Extending inwardly from the distal edge of the blade 32 are a plurality of slots 42 that are sized and shaped to receive—and capture—the hooks that hang downwardly from a typical fishing lure. (The bodies of two exemplary lures 44, 46 are shown in broken lines over a blade shown in FIG. 8.) The width of a given slot 42 should be selected so as to slidably receive the shank of a typical treble hook that is found on most fishing lures; a suitable width for a slot will likely be about 1/8 inch. In FIG. 8, the angle that the diagonal slot makes with respect to a perpendicular "construction" line from the axis 40 is about 25 degrees; in FIG. 10 the angle between a perpendicular construction line and the slot is about 45 degrees. And in FIG. 9, the slots are oriented so as to be perpendicular to the longitudinal axis 40. For purposes of illustration, the blade in FIG. 10 is shown "flipped" with respect to the blades in FIGS. 8 and 9, to better show how treble hooks are captured by the slots.

Referring again to FIG. 4, it will be seen that fishing lures on any given blade 32 cannot be expected to remain on that blade is the blade is inverted, unless some kind of a retainer is used to restrain the lures and keep them from falling out of a relatively "loose" slot. This is preferably accomplished by affixing a pivotable member 50 at the distal edge of a blade—near one corner of the blade. Each of the pivotable members 50 is designed to engage a blade with sufficient friction to remain in place as the holder 36 rotates. If desired, the retainer 50 may be made at least somewhat resilient and provided with a ;memory that will give it a spring-like action, so that it may be distended (i.e., spread apart) to fit over the distal edge of a vane-like member 32. Unwanted disengagement of a retainer 50 will not likely be much of a problem, because fishing lures are not very heavy, and the rotational speed of a holder 36 will never be very great; so it is not expected that there will ever be a significant load that would tend to "unlatch" a member 50. On the other hand, to manually grab a member 50 and rotate it away from the slot openings that is guarding at the distal edge of a blade 32 will be relatively easy.

It should also be noted that there is no need to spring-load the members 50, so they will usually remain completely out of the way of a fisherman—after they have been rotated by about 90 degrees away from their "latched" positions. And when a pivotable member 50 is out of the way, a single hand can be used to grab the body of a lure and guide the depending hooks easily into an empty slot. By grabbing only a lure's body, a fisherman does not have to worry so much about accidentally coming into contact with the boards of a hook during the step of storing or retrieving a lure. It is perhaps also worthy of mentioning that the length of a retaining member 50 is deliberately established at about one-half of the length of a plate 32, so that an unfolded member will be less likely to be hit by something and get bent or broken. But even if a given retaining member 50 were to become broken on a fishing trip, an advantage of the design disclosed herein is that a strong rubber band can be stretched across the outer edge of a plate 32 to temporarily hold lures in their respective slots until a replacement member can be installed.

Figure 11:
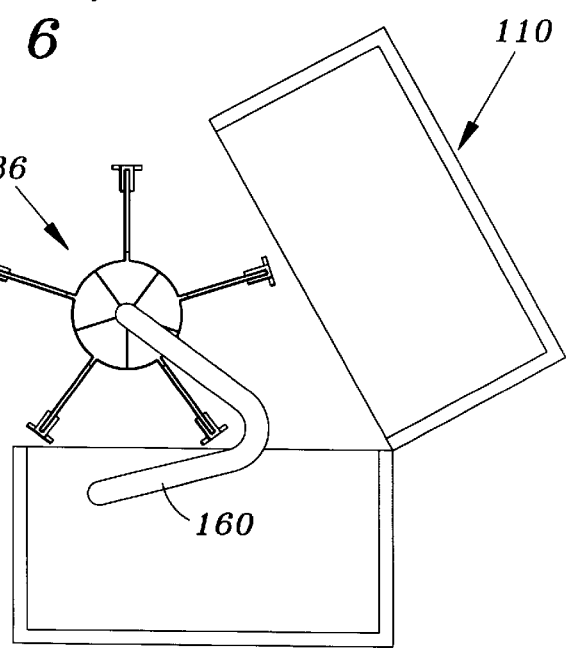
FIG. 11 is a transverse cross-sectional view of a lure holder that is in the process of being removed from a box, so that the lure holder and the box may be temporarily separated.

Turning next to FIG. 11, another embodiment of the invention is shown in which a fishing lure holder 136 is independently supported on a portable frame 160, so that it may be selectively removed from (and later returned to) a box 110. While this embodiment may have some advantages, there is no way to rotate the holder 136 by applying torque to an end cap—as indicated by the curved arrow 58 in FIG. 1. Too, accidentally overturning the first embodiment of the invention will never result in the loss of all of the lures that are stored in the box 10. But overturning the embodiment in FIG. 11 could result in the loss of all of the lures on holder 136—if the top of the box 110 happens to be open when the box is overturned. So there are definite advantages to the first-described, and preferred, embodiment.

While only the preferred embodiments of the invention and one alternative embodiment have been disclosed herein, those skilled in the art will no doubt recognize that variations in some details could be readily made without departing from the spirit of the invention. Hence, it should be understood that the breadth of the invention should be measured only by the scope of the claims appended hereto.

What is claimed is:

1. A combination of a plurality of fishing lures and a portable apparatus adapted for carrying those fishing lures and making them available for inspection and, when desired, selective removal by a fisherman, and at least some of said lures having a body and at least one treble hook depending downwardly from the lure's body, comprising:
   a) a portable box having a top and a bottom, a front and a back, and two spaced-apart endwalls, and the box having a length defined by the distance between the two endwalls, and the box having a width defined by the distance between the front and the back, and the box having a height defined by the distance between the top and the bottom, and the box having an interior and an exterior;
   b) an elongated element having a length that will permit it to fit within the box's interior with an orientation that is generally parallel to the box's length, and the elongated element being positioned in such a way that it is rotatable within the box about an axis that is generally parallel to the box's length;
   c) a plurality of thin and generally planar blades supported by and movable with the elongated element, and the blades extending outwardly from the elongated element in a generally radial manner, and each of the blades having a proximal edge that is connected to the elongated element, and each of the blades having a distal edge that is radially outward of and remote from the elongated element, and each of the blades also having first and second generally parallel side surfaces that extend from the proximal edge to the distal edge, and the first and second side surfaces being separated by a finite distance that establishes the thickness of a blade, and at least most of the blades having slots that extend inwardly from a blade's distal edge, and the slots being shaped and sized to receive and support individual ones of a plurality of fishing lures by placing a given lure's body along one side surface of a certain blade while simultaneously placing the depending treble hook of that same lure along the other side surface of said certain blade, and the respective slots in a blade having widths that are large enough to freely receive the shanks of lure hooks but not large enough to pass the treble barbs on those hooks; and
   d) means affixed to and carried by the blades for securing against unwanted removal those fishing lures that are being supported in given ones of the slots on a given blade, whereby neither a change in position nor a change in orientation of a blade will affect the efficacy of said means for securing fishing lures against unwanted removal from a given slot.

2. The combination as claimed in claim 1 wherein the elongated element is permanently mounted for rotation within the box.

3. The combination as claimed in claim 1 wherein said means for securing fishing lures against unwanted removal from a given slot includes a pivotable member that is anchored to the distal edge of the given blade having said given slot, and said pivotable member being connected so that the act of pivoting it downward until it makes contact with the distal edge of the given blade will secure stored fishing lures against removal, and wherein pivoting the pivotable member upward with respect to the distal edge of the given blade will permit fishing lures on the given blade to be selectively removed.

4. The combination as claimed in claim 1 wherein said means for securing fishing lures against unwanted removal from a given blade constitutes a rigid member that is about half as long as the blade to which it is affixed, whereby said rigid member can serve to simultaneously secure about half of the fishing lures that are being supported by the given blade.

5. The combination as claimed in claim 1 and further including a structural cap that is mounted exteriorly of the box but which is rigidly connected to the elongated element that is inside the box, and wherein manual rotation of the structural cap causes the elongated element to rotate about its longitudinal axis, whereby a fisherman is capable of applying torque to the exterior structural cap to cause the elongated element and the blades to rotate inside the box.

6. The combination as claimed in claim 5 wherein at least a portion of the top of said box is transparent, such that a fisherman is capable of viewing all of the individual fishing lures that are contained within the box by looking through the transparent portion of the top and without removing the top of said box.

7. The combination as claimed in claim 5 wherein the elongated element has two ends and there are two structural caps mounted exteriorly of the box which are respectively secured to the two ends, whereby a fisherman is capable of causing the elongated element to rotate by applying torque to either one or both of the two structural caps.

8. The combination as claimed in claim 1 wherein some of the slots are oriented so as to be parallel to the two endwalls of said box, and some of the slots are oriented so as to be generally diagonal with respect to the two endwalls of said box.

9. The combination as claimed in claim 1 wherein the elongated element is selectively removable from the box, whereby the plurality of fishing lures can be simultaneously washed by first removing the elongated element from the box and then directing a stream of cleaning water at the combination of three things, namely, the elongated element, and the blades that are attached to said elongated element, and the fishing lures that are secured to the blades.

10. The combination as claimed in claim 1 wherein the plurality of generally planar blades includes at least three blades that rigidly extend outwardly in a cantilevered manner from the elongated element, and there being measurable angles between adjacent blades when the blades are viewed in a direction that is parallel to the axis about which the elongated element rotates, and wherein the respective angles between adjacent blades are approximately uniform.

11. The combination as claimed in claim 1 wherein the plurality of generally planar blades includes five blades that rigidly extend outwardly in a cantilevered manner from the elongated element, and said five blades are spaced from one another by distances that are approximately equal.

12. The combination as claimed in claim 1 wherein the blades are rigidly attached to one another, whereby manually causing one blade to move in a given direction will simultaneously cause all of the blades to move.

13. The combination as claimed in claim 1 wherein the blades each have a thickness of about 3/32 inch, and the blades each have an area defined by multiplication of a blade's length by its width, and the area of each blade is at least 50 square inches.

14. The combination as claimed in claim 1 wherein each of said blades has a minimum of nine slots for receiving and storing the fishing lures.

15. The combination as claimed in claim 1 wherein there are a plurality of slots on a given blade that are less than one inch apart, such that depending hooks on a given fishing lure can be inserted into a single slot or into two different slots.

16. The combination as claimed in claim 1 wherein the slots on a given blade are at least three inches long.

17. The combination as claimed in claim 1 wherein there are at least three differently configured blades affixed to the elongated element.

18. The combination as claimed in claim 1 wherein the elongated element is formed by connecting together a plurality of discrete pieces, and the discrete pieces are integrally formed with the proximal portions of the blades, whereby the elongated element is formed by first bringing together the proximal portions of the plurality of blades and subsequently connecting together the discrete pieces to assemble the elongated element as a whole.

* * * * *